(12) United States Patent
Hermansen et al.

(10) Patent No.: US 6,467,474 B2
(45) Date of Patent: Oct. 22, 2002

(54) PORTABLE BARBEQUE GRILL

(76) Inventors: Arlen W. Hermansen, 1916 Dean Rd., Paradise, CA (US) 95969; Allan W. Hermansen, 504 Sutter St., Petaluma, CA (US) 94954

( * ) Notice: Subject to any disclaimer, the term of this patent is extended or adjusted under 35 U.S.C. 154(b) by 0 days.

(21) Appl. No.: 09/816,039

(22) Filed: Mar. 21, 2001

(65) Prior Publication Data

US 2002/0134369 A1 Sep. 26, 2002

(51) Int. Cl.[7] .............................................. A47J 37/00
(52) U.S. Cl. ........................ 126/25 R; 126/9 R; 126/144
(58) Field of Search ......................... 126/9 R, 9 A, 126/25 R, 144, 41 R, 275 R, 332, 334

(56) References Cited

U.S. PATENT DOCUMENTS

| | | | |
|---|---|---|---|
| 2,419,344 A | * 4/1947 | Eggleston | 126/25 R |
| 2,477,529 A | * 7/1949 | Sprinkle et al. | 126/9 R |
| 2,985,164 A | * 5/1961 | Imoto | 126/9 R |
| 3,380,444 A | * 4/1968 | Stalker | 126/25 R |
| 3,520,290 A | * 7/1970 | Winters | 126/25 R |
| D237,121 S | 10/1975 | Metzner | |
| D258,175 S | 2/1981 | Hazeltine | |
| D281,836 S | 12/1985 | Sparkman | |
| D301,106 S | 5/1989 | Oliphant | |
| 4,840,118 A | 6/1989 | Rinehart | |
| D302,641 S | 8/1989 | Elmburg | |
| D303,061 S | 8/1989 | Fountain, Sr. | |
| 5,032,183 A | 7/1991 | Frazier | |
| D323,444 S | 1/1992 | Masters | |
| 5,437,222 A | 8/1995 | Franklin | |
| 5,501,142 A | 3/1996 | Bailey | |
| D388,251 S | 12/1997 | Smith | |
| 5,947,105 A | * 9/1999 | Scott et al. | 126/9 R |
| D420,244 S | 2/2000 | Pai | |
| 6,058,832 A | 5/2000 | Fountain | |
| D428,760 S | 8/2000 | Huang | |
| D430,776 S | 9/2000 | Pai | |
| 6,213,004 B1 | 4/2001 | Franco | |

* cited by examiner

Primary Examiner—James C. Yeung
(74) Attorney, Agent, or Firm—Squire, Sanders & Dempsey, L.L.P.

(57) ABSTRACT

This invention relates to a barbeque grill capable of being conveniently transported to remote outdoor locations.

20 Claims, 11 Drawing Sheets

PORTABLE BARBEQUE GRILL

FIELD OF THE INVENTION

This invention is a portable barbeque grill.

DESCRIPTION OF THE BACKGROUND

Outdoor activities such as camping have gained popularity among people of all age groups. Tailgating outside of a stadium parking lot before a football or baseball game has become a pre-game ritual for fans across the country. Spending a sunny day at the beach or the park is one of the simple pleasures in life that can be shared by a family or group of friends. All such activities share one commonality, eating. The barbeque grill is typically the Mecca around which these activities are performed. Watching the burning fire exuding off the coals while smelling the cooking aroma of a steak or sausage enhances the enjoyment of the activity.

The transportation of a grill to and from a remote location is, however, a burdensome task, one which may outweigh the good of barbequing. What is needed is a barbeque grill that is easy to transport prior and subsequent to its use and which does not create a significant mess or inconvenience during the transportation process.

Another problem associated with small, portable barbeque grills is the dissipation of heat. In a picnic type setting, such grills can char the surface, such as a wooden table, upon which they are placed. Additionally, subsequent to their use, the grills cannot be placed back into the car until after a prolong duration of time has elapsed to allow the grill to cool down. Accordingly, what is needed is a small barbeque grill that cools off more rapidly and that does not singe the surface upon which it is placed if used for a reasonable duration of time. Other additional functional features include a grill which is easy to clean and maintain and which can be transported without difficulty.

SUMMARY

In accordance with one aspect of the present invention, a portable barbeque grill is provided, comprising a firebox for containing a burning element such as coal. A housing unit contains the firebox such that the firebox is positioned at a distance away from the housing unit to create a gap between the burning element and the housing unit.

In one embodiment, the housing unit comprises a front wall, a rear wall, sidewalls, and a bottom wall and the firebox comprises a front wall, a rear wall and side walls, the walls of the firebox being positioned at a distance away from the respective walls of the housing unit. The firebox can also include a platform assembly supporting the walls of the firebox for elevating the walls of the firebox at a position above the bottom wall of the housing unit. The platform can have a grid-like structure for allowing residues of the burning element to fall within the housing unit on top of the bottom wall. The platform can be defined by a grid-like base and a pair of opposing flanges extending from the base for elevating the grid-like base above the bottom wall of the housing.

In accordance with another embodiment, the firebox comprises a front wall, a rear wall, sidewalls, and a bottom wall and flanges extending from the corners where the front wall and the rear wall meet the sidewalls for creating a gap between the walls of the firebox and the walls of the housing unit. The flanges can extend beyond the bottom wall of the firebox for elevating the bottom wall of the firebox above the bottom wall of the housing unit. At least one of the walls of the firebox can contain a plurality of holes.

A lid can be pivotally connected to the rear wall for releasably locking to the front wall for enclosing the open top of the housing unit. The lid can comprise a handle bar for allowing a user to transport the portable barbeque grill when the lid is in a locked position. In one embodiment, the lid, in an open state, does not extend beyond a generally vertical position for blocking the wind from blowing onto the firebox. In accordance with another embodiment, the lid, in an open position, does not extend beyond a generally horizontal position for allowing a user to place food or barbeque tools on an inside face of the lid. In such an embodiment, the portable grill can include a support rod extending from the lid for supporting the lid against the surface upon which the portable barbeque grill is placed. The support rod prevents the barbeque grill from tipping over if food or barbeque tools are placed on the inside face of the lid.

In accordance with another embodiment, the lid can include a first lid section pivotally connected to the rear wall and a second lid section pivotally connected to the front wall. The first and second lid sections can pivotally come together to enclose the open top of the housing unit.

In accordance with yet another embodiment, the portable grill includes legs extending from the housing unit for elevating the housing unit above a surface upon which the housing unit is placed.

A heat shield can be coupled to the bottom wall of the housing unit or, alternatively, to the legs and positioned at a distance away from a bottom surface of the bottom wall. The heat shield prevents the surface upon which the housing unit is placed from charring when the portable grill is used for a reasonable duration of time.

In accordance with another aspect of the invention a portable grill is provided, comprising a housing unit of a sufficiently small dimension for allowing a user to conveniently carry the portable grill with one hand to a remote outdoor location. The grill includes a heat shield positioned at a distance away from an undercarriage of the housing unit for creating a thermal gap between the undercarriage and the heat shield.

DETAIL DESCRIPTION OF THE EMBODIMENTS

Figure 1:
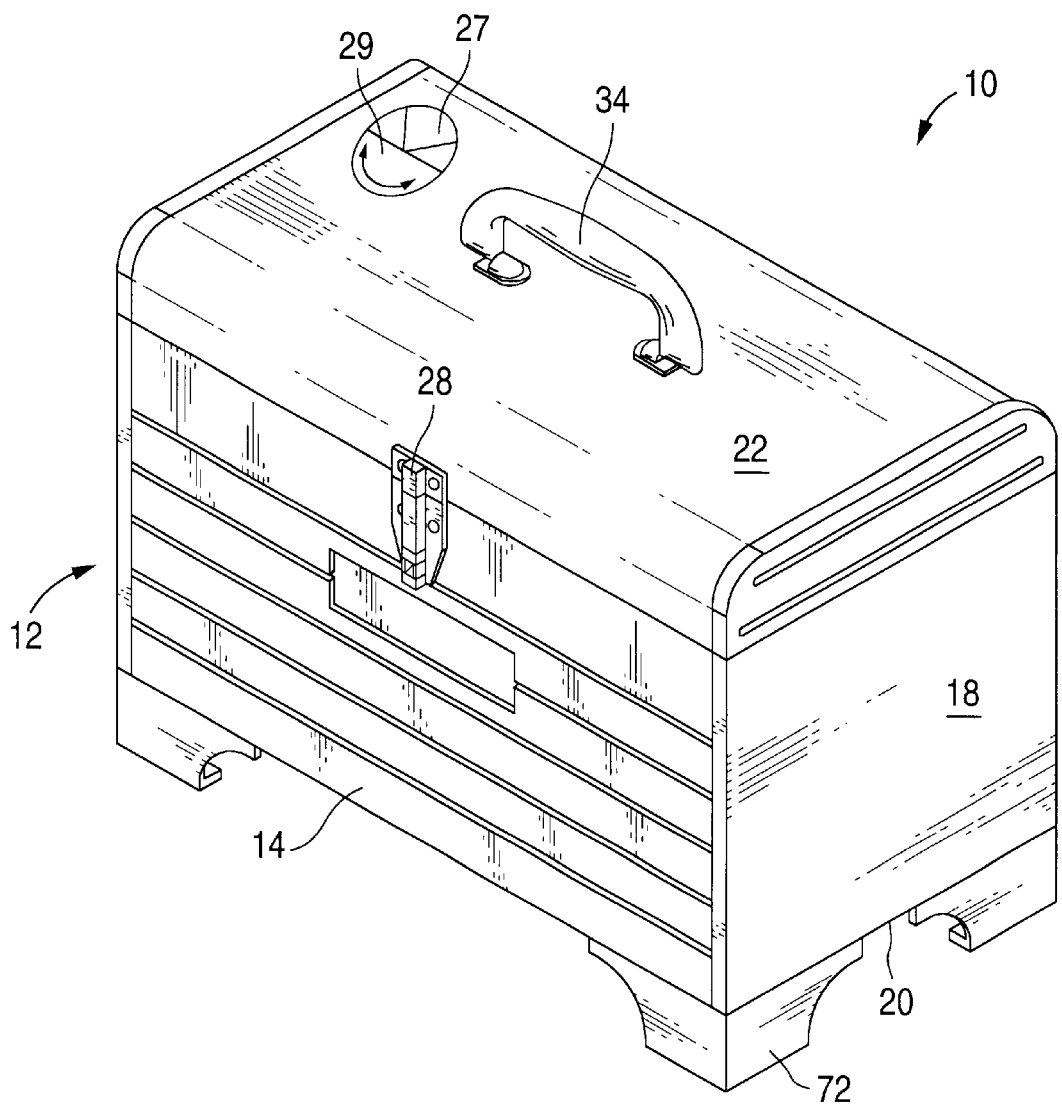
FIG. 1 is a perspective view of a portable barbeque grill in accordance with one embodiment of the present invention.

Referring now to the Figures, wherein similar elements are referred to by identical reference numbers, there is illustrated a portable barbeque grill 10 of a suitably small size so as to allow a user to conveniently carry grill 10 to remote outdoor locations, such as camp sites, sporting events, and parks. By way of example and not limitation, grill 10 can be 49.7 cm in length, 22.3 cm in width, and 30.0 cm in height. Referring to FIGS. 1–7, there is illustrated grill 10 in accordance to some of the embodiments of the present invention. Grill 10 includes a housing unit 12 having a front wall 14, a rear wall 16, sidewalls 18, and a bottom wall or an undercarriage 20.

Figure 2:
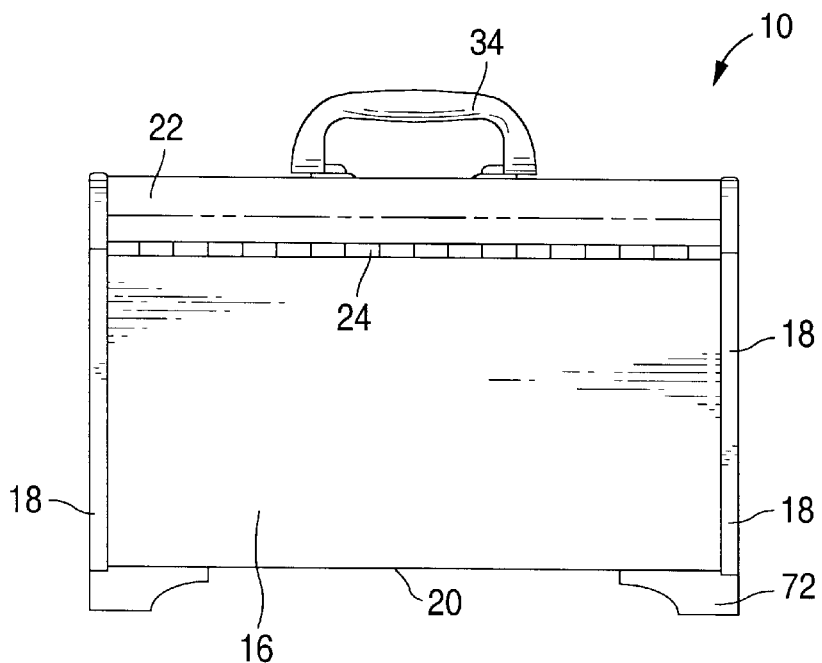
FIG. 2 a rear view of the portable grill of FIG. 1.

A lid 22 can be pivotally connected to rear wall 16 by a hinge assembly 24 (see FIG. 2). Housing unit 12 can include a lip 26 indented about the perimeter thereof so as to allow lid 22 to fittingly mate over housing unit 12. A locking element 28 can be used to securely lock lid 22 to front wall 14. Any suitable number of locking elements 28 can be used, such as one or two. Housing unit 12 and lid 22 can be made from any suitable metallic material or alloy, such as stainless steel, cast iron, aluminum, titanium, and the like. In one embodiment, as illustrated in FIG. 1, a ventilation opening 27 can be positioned in lid 22. A cap 29 can be placed over ventilation opening 27 such that the clockwise or counter-clockwise rotation of cap 29, as illustrated by the arrow, can cover or uncover ventilation opening 27. Accordingly, cap 29 can be used to maintain the heat within, control the temperature of, ventilate, and feed oxygen to housing unit 12.

Figure 3:
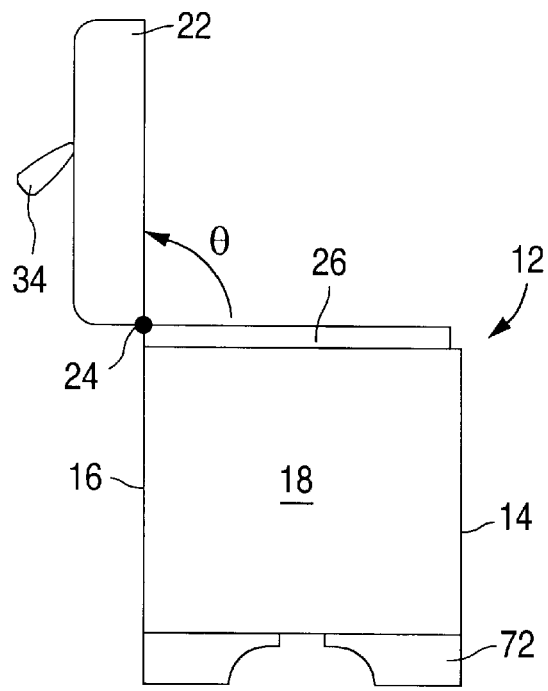
FIG. 3 is a side view of one embodiment of the portable grill of FIG. 1.

In one embodiment, as illustrated in FIG. 3, the rotation of lid 22 should not extend beyond a generally vertical position. "Generally vertical" is defined as extension of lid 22 slightly greater than the absolute vertical position, i.e., $\Phi > 90°$ (e.g. $\Phi = 91°-95°$) so as to prevent lid 22 from accidentally closing during the operation of grill 10. The vertical positioning allows lid 22 to act as a shield against wind or other adverse outdoor conditions. Alternatively, as illustrated in FIG. 4, lid 22 should not extend beyond a generally horizontal position (i.e., $\Phi$=about 180°) which would allow the interior surface of lid 22 to act as a platform for supporting various barbeque tools or food items during the cooking process.

Figure 4:
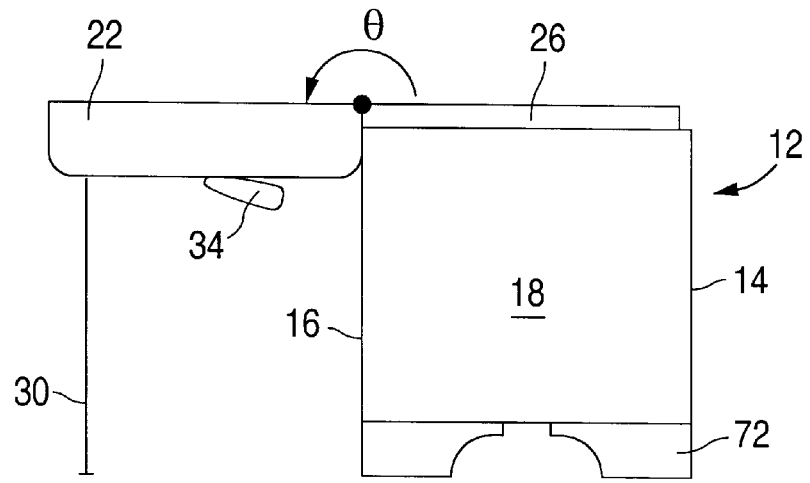
FIG. 4 is a side view of another embodiment of the portable grill of FIG. 1.
Figure 5:
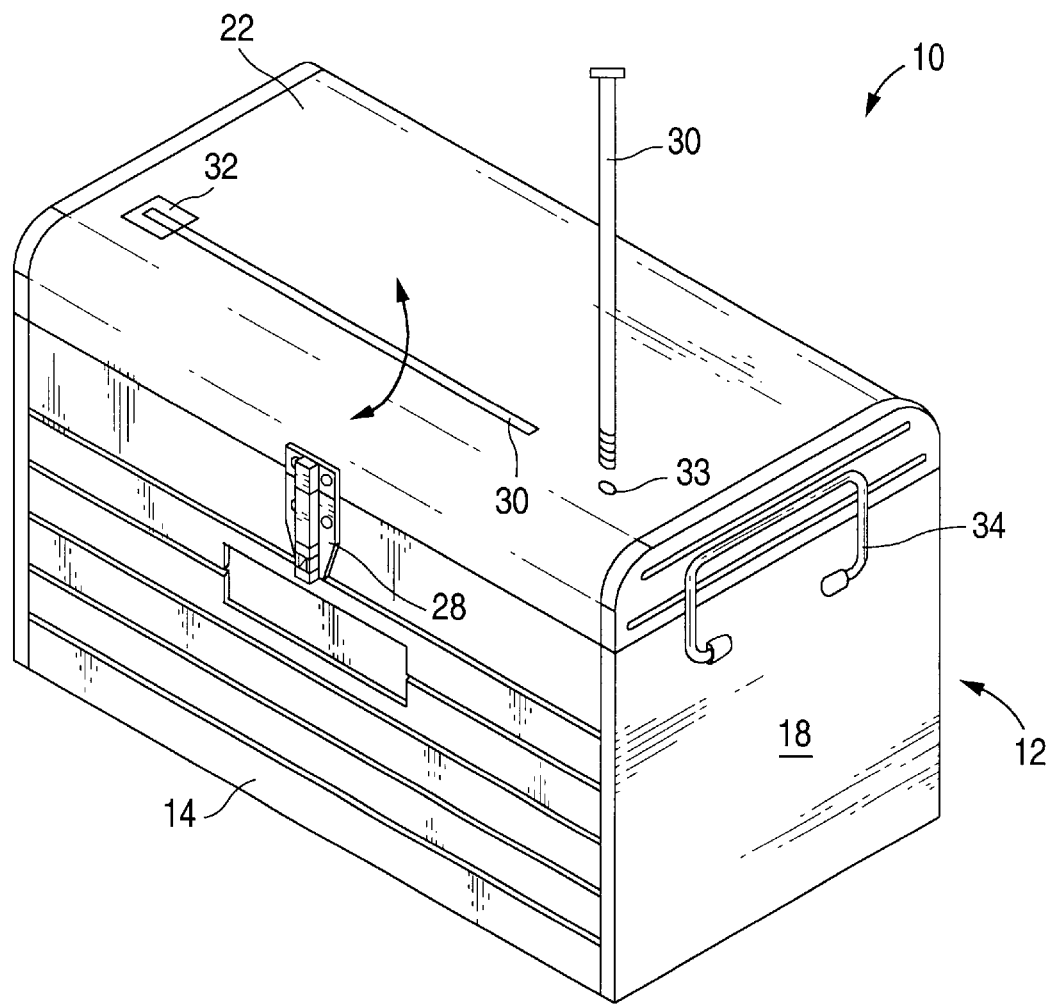
FIG. 5 is a perspective view of the portable grill in accordance with another embodiment of the present invention.

In the embodiments where lid 22 pivotally opens to a horizontal position, a staff or support rod 30, as illustrate in FIGS. 4 and 5, can be used to prevent grill 10 from tipping over if barbeque tools or food items are placed on lid 22. Support rod 30 can be pivotally coupled to lid 22 by, for example, a pin assembly 32 or alternatively, support rod 30 can be threaded at one end and removably received by an aperture 33 in lid 22. Pin assembly 32 provides for a permanent engagement of support rod 30 to lid 22 and allows support rod 30 to swivel towards and away from lid 22, as illustrated by the arrows. Support rod 30 should be long enough so as to steadily support grill 10 on the surface upon which grill 10 is placed but short enough to maintain lid 22 at a generally horizontal position.

Figure 7:
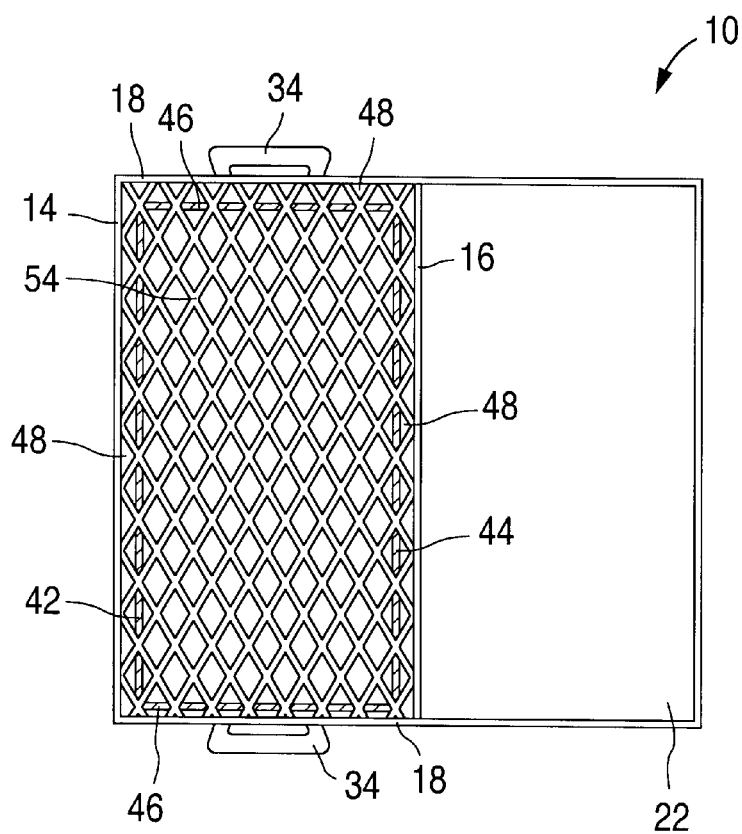
FIG. 7 is a top view of the portable grill, illustrating the firebox and cooking surface positioned in the portable grill.

A handle 34 can be coupled to lid 22 for allowing a user to carry grill 10 when lid 22 is in a locked position. Handle 34 need not be permanently coupled to lid 22, in that a removable handle 34, which can be releasably engaged to lid 22, can also be employed. In lieu of positioning handle 34 on top of lid 22, a pair of handles 34 can be placed on sidewalls 18, as is illustrated in FIGS. 5 and 7. Handle 34 can be made from any suitable metallic material. Alternatively, handle 34 can be made from phenolic.

Figure 6:
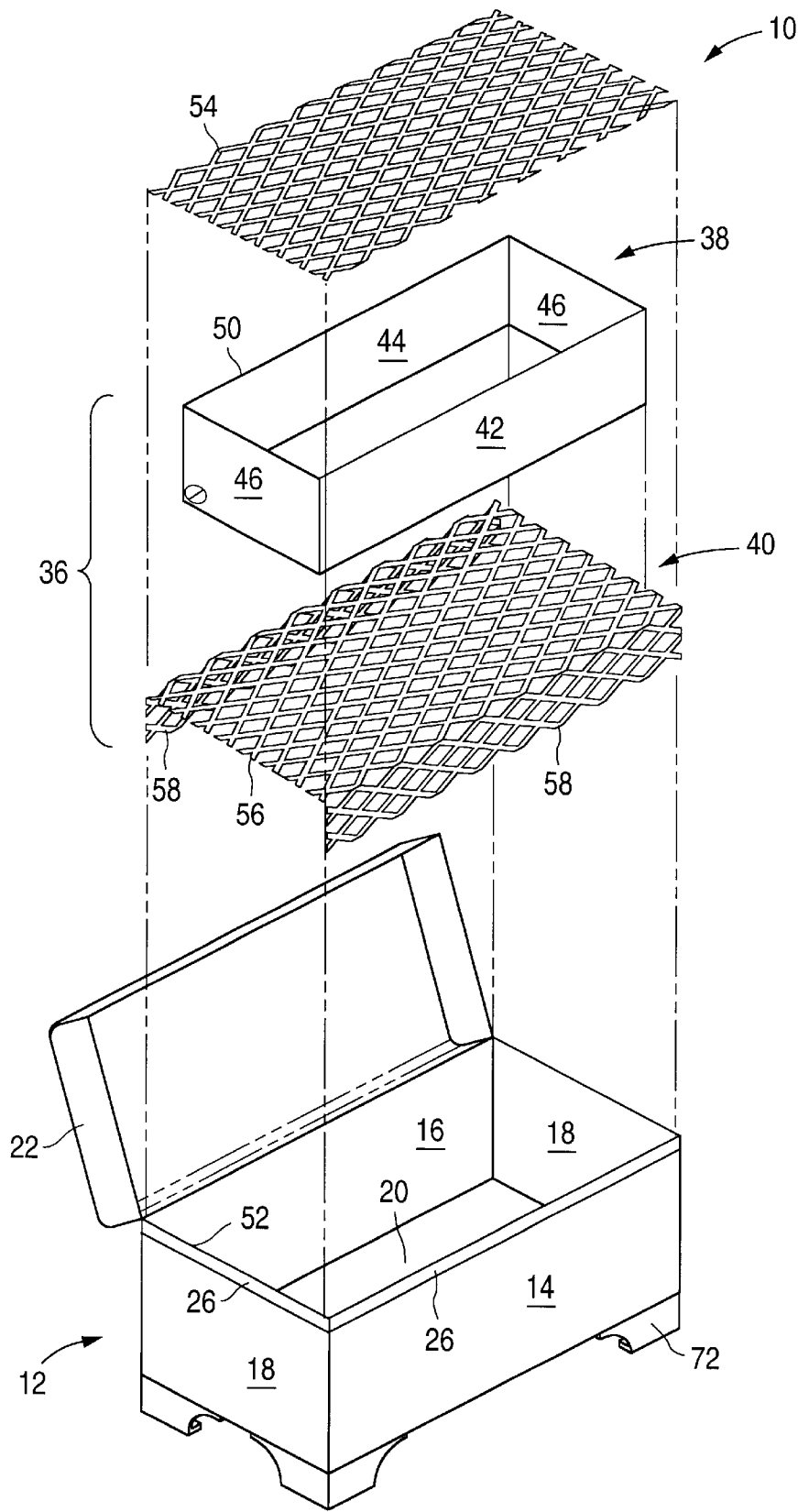
FIG. 6 is an exploded view of one embodiment of the portable grill, illustrating one embodiment of a firebox and a cooking surface.

Referring to FIG. 6, one embodiment of a firebox 36 used in conjunction with housing unit 12 is illustrated. Firebox 36 is used to contain a burning element such as coals or synthetically produced combustible materials. Firebox 36 includes a container 38 and a platform 40. Container 38 is defined by a front wall 42, a rear wall 44 and sidewalls 46 joining front wall 42 to rear wall 44. Container 38 has an open top and bottom. Dimensions of container 38 should be small enough to: (1) allow container 38 to be placed in housing unit 12; (2) provide a space between walls 42, 44, and 46 of firebox 36 and the respective walls 14, 16, and 18 of housing unit 12 so as to provide a thermal gap 48 therebetween (see FIG. 7); (3) prevent an upper edge 50 of container from exceeding beyond an upper edge 52 of housing unit 12; and (4) allow for a sufficient space for the placement of a cooking rack 54 on upper edge 50 of container 38. Protrusion of the cooking surface of cooking rack 54 beyond upper edge 52 of housing unit 12 is not desired. Cooking rack 54 should sit within housing unit 12. In an alternative embodiment, cooking rack 54 can sit, for example, on tabs (not illustrated) protruding from the walls 14, 16 and 18 of housing unit 12 in lieu of cooking rack 54 resting on container 38. One of ordinary skill in the art can appreciate that cooking rack 54 can be grid-like, as illustrated, or wire-like and can be made from or coated with a non-stick cooking material such as Teflon.

Referring to FIG. 7, thermal gap 48, defined by the space between walls 42, 44, and 46 of firebox 36 and the respective opposing walls 14, 16, and 18 of housing unit 12, causes a reduction in temperature for housing unit 12 and for housing unit 12 to cool-off at a rapid rate. By way of example and not limitation, thermal gap 48 can be from about 8 mm to about 5 cm in distance (from the outer surface of front wall 42 to the inner surface of front wall 14). To further insulate housing unit 12 from the heat, container 38 can be made from a metallic material such as cast iron, aluminum, stainless steel, titanium having a thickness of about 0.5 mm to about 1 cm.

Platform 40 for firebox 36, as illustrated in FIG. 6, can have a grid-like structure and can include a base 56 having an opposing pair of flanges 58 extending downwardly out from base 56. Container 38 rests on or can be coupled to base 56 within housing unit 12. Flanges 58 elevate container 38 above bottom wall 20 of housing unit 12 to create a thermal gap beneath container 38. The grid-like structure of base 56 allows residues of the burning element, such as the ashes of the coals, to fall within housing unit 12, on top of bottom wall 20. Flanges 58 can elevate container 38 about 1 cm to about 20 cm above bottom wall 20. Platform 40 can be made from cast iron, stainless steel, aluminum, titanium, and the like.

Figure 8:
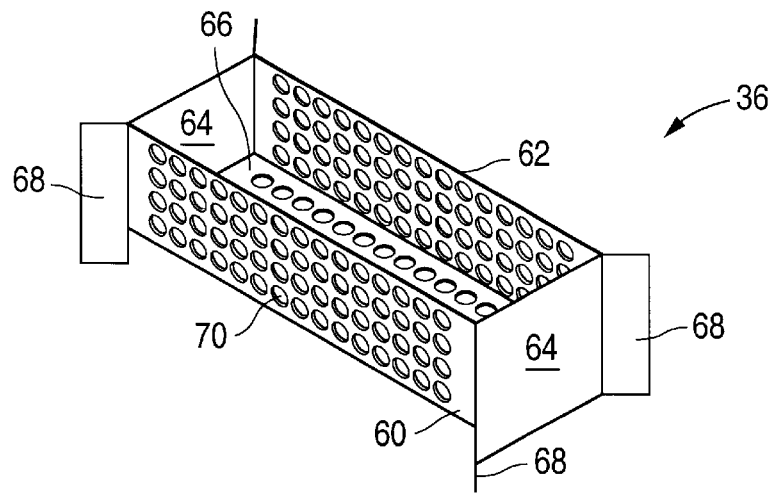
FIG. 8 is a perspective view of another embodiment of the firebox.
Figure 9:
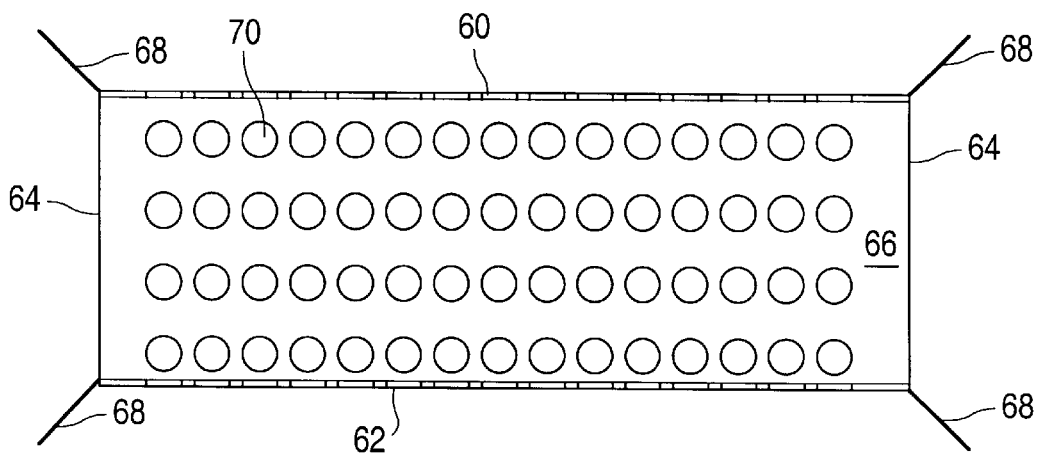
FIG. 9 is a top view of the firebox of FIG. 8.
Figure 10:
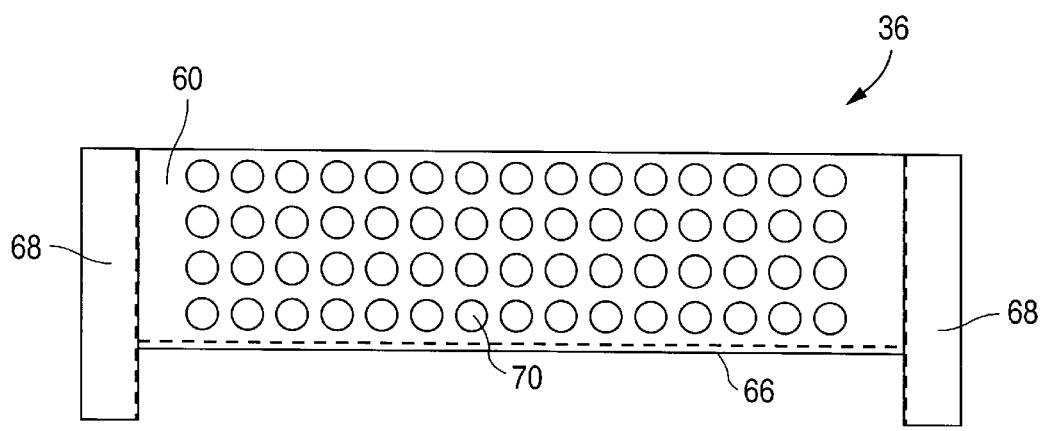
FIG. 10 is a front view of the firebox of FIG. 8.
Figure 11:
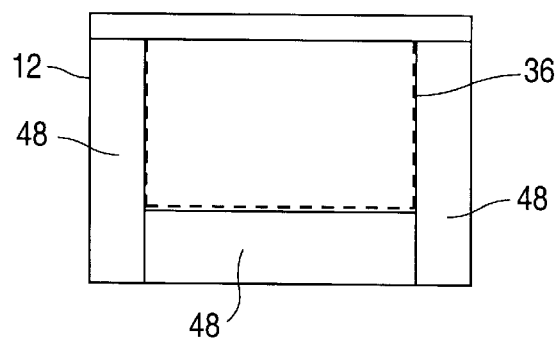
FIG. 11 is a cross sectional view of the portable grill, illustrating the firebox of FIG. 8 positioned therein.

Another embodiment of firebox 36 is illustrated in FIGS. 8–11. Firebox 36 includes a front wall 60, a rear wall 62, sidewalls 64, as well as a bottom wall 66. Flanges 68 protrude from the corners where front 60 and rear 62 walls meet sidewalls 64. Flanges 68 can also extend beyond bottom wall 66 of firebox 36 for elevating bottom wall 66 of firebox 36 above bottom wall 20 of housing unit 12. Accordingly, as best illustrated in FIG. 11, thermal gap 48 surrounds firebox 36. Flanges 68 also provide support for cooking rack 54 should cooking rack 54 be placed on firebox 36. FIGS. 8, 9, and 10 illustrate front wall 60, rear wall 62, and bottom wall 66 having a plurality of holes 70. Holes 70 allow for the feeding of oxygen to the coals so as to allow the coals to burn more evenly. Holes 70 in bottom wall 66 also allow the ashes and residues of the coals to fall within housing unit 12. The positioning, pattern, quantity, shape, and placement of holes 70 should not be limited to what has been illustrated in the Figures. For example, sidewalls 64 can include holes 70 in addition to or in lieu of front 60, rear 62 and bottom 66 walls. Alternatively, walls 60, 62, 64, and 66 can be without holes.

In accordance with another embodiment of the present invention, housing unit 12 can have legs 72 for elevating housing unit 12 above the surface upon which grill 10 is placed. Legs can elevate the housing unit about, for example, 5.5 cm above the surface so as to prevent direct contact of bottom wall 20 to the surface upon which grill 10 is placed.

Figure 12:
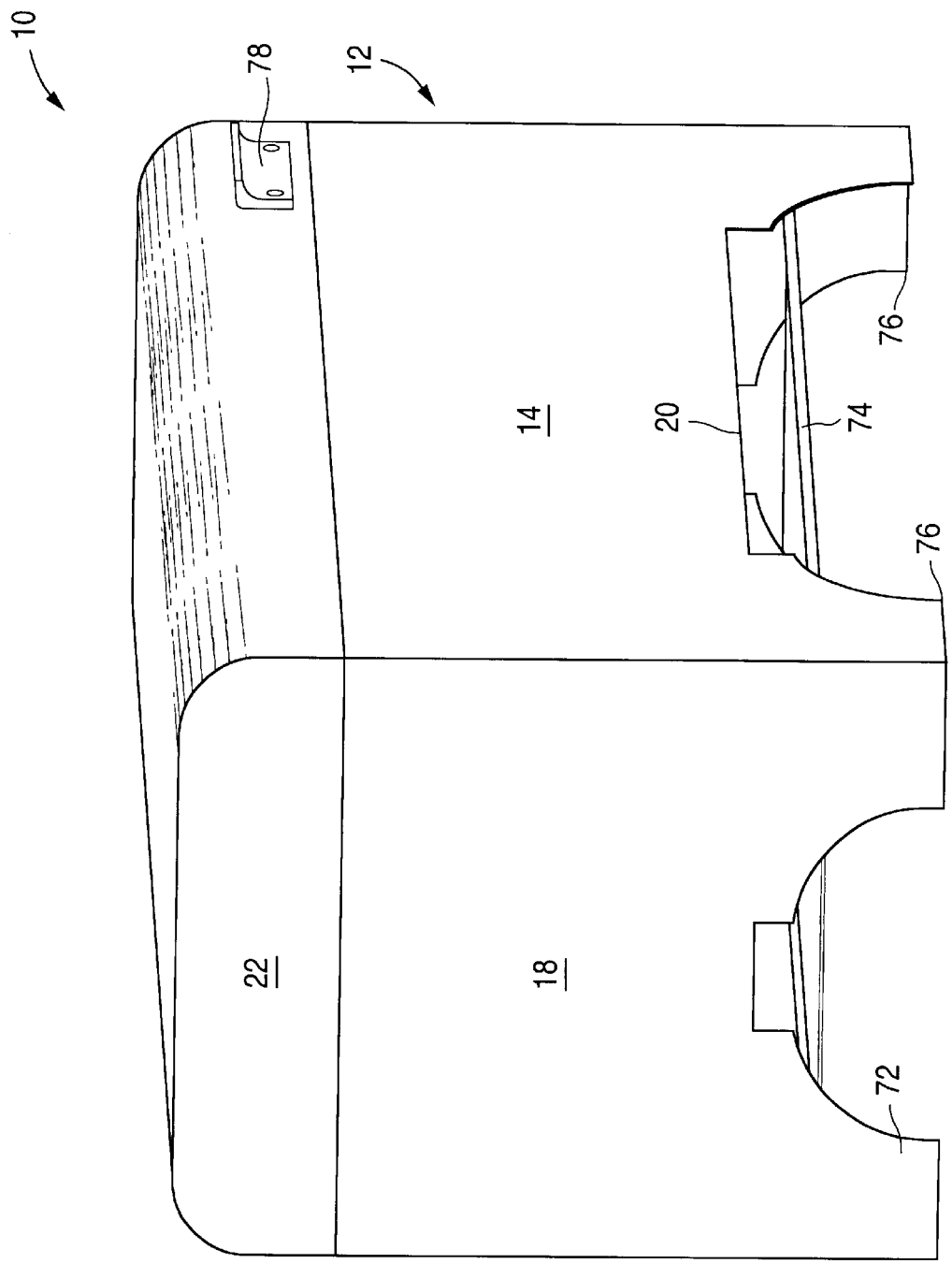
FIG. 12 is a perspective view of another embodiment of the portable grill of the present invention.
Figure 13:
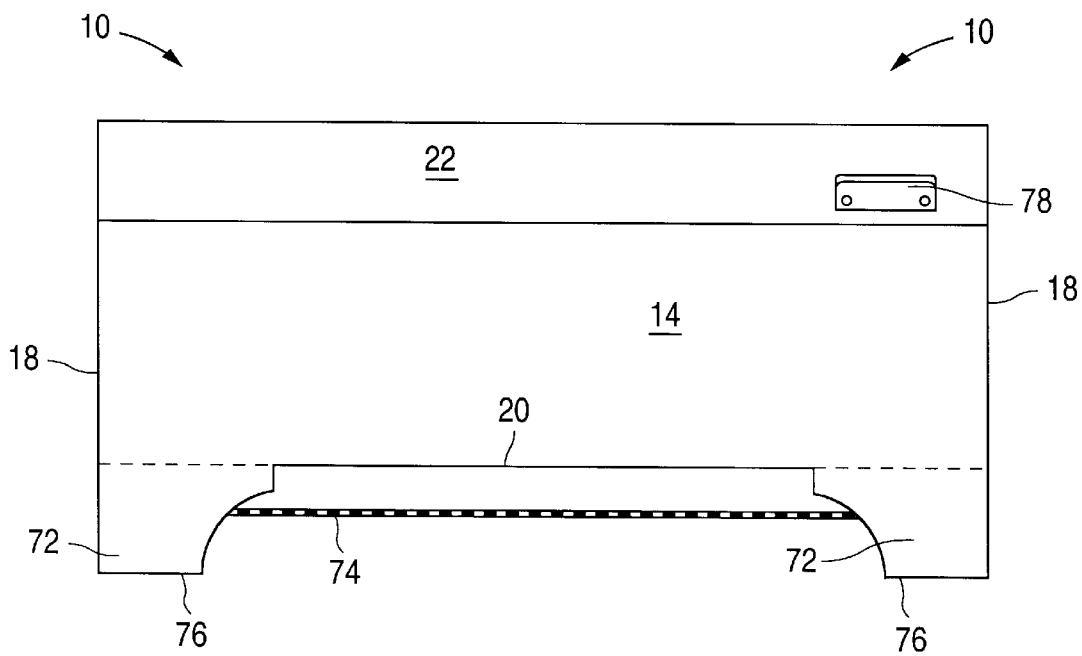
FIG. 13 is a front view of the portable grill of FIG. 12.
Figure 14:
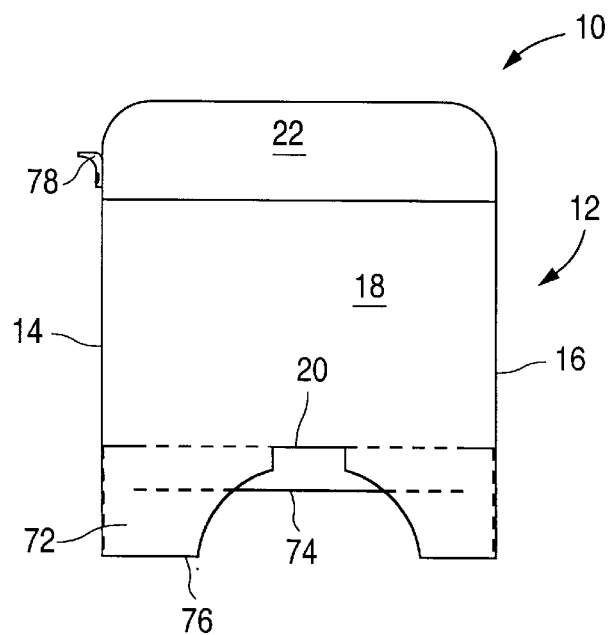
FIG. 14 is a side view of the portable grill of FIG. 12.

Referring to FIGS. 12–14, a heat shield 74 can be coupled to legs 72 and extended in a parallel direction with bottom wall 20 of housing unit 12. One of ordinary skill in the art can appreciate that heat shield 74 can be coupled by any suitable means to undercarriage 20. Heat shield 74 can be made from any suitable material including aluminum, cast iron, stainless steel, titanium and the like. Heat shield 74 can have any suitable thickness, for example from about 0.5 mm to about 3 mm more narrowly from about 1 mm to about 2 mm. Heat shield 74 should be positioned not only at a distance away from bottom wall 20 of housing unit 12 but also at a distance away from the surface upon which grill 10 is placed. By way of example and not limitation, heat shield 74 should be positioned at a distance of about 5 mm to about 5 cm, more narrowly about 1 cm to about 3 cm from bottom wall 20 of housing unit 12. For example, heat shield 74 can be placed at about 1.6 cm from bottom wall 20. Heat shield 74 should also be positioned, for example, from about 5 mm to about 5 cm above bottom edges 76 of legs 72, i.e., above the surface from which grill 10 is placed. More narrowly, heat shield 72 can be about 2.5 cm to about 4.5 cm, for example about 3.9 cm above the surface upon which grill 10 is placed. Heat shield 74 can prevent the surface upon which grill 10 is placed, for example a wooden park table, from charring when grill 10 is used for a reasonable duration of time.

As further illustrated in FIGS. 12–14, a lift tab 78 can be placed on lid 22 for allowing a user to open and close lid 22. Lift tab 78 can be made from a metallic material. Phenolic is a heat resistant material and would be a suitable choice of material for lift tab 78.

Figure 15:
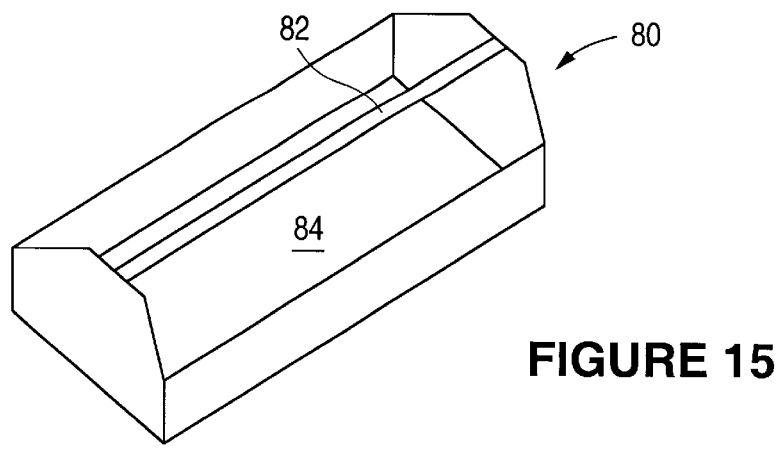
FIG. 15 is a perspective view of a tray in accordance with one is embodiment of the present invention.

Referring to FIG. 15, a tray 80 can also be provided for storage of food items and/or cooking equipment when grill 10 is not being used. Tray 80 can fit into the housing unit 12 and rest on top of firebox 36, on top of cooking rack 54, or simply within housing unit 12. Lid 22 should be capable of closing with tray 80 disposed in housing unit 12. Tray 80 can include a handle 82. Tray 80 can also provide a cooking surface 84 for keeping food warm or for cooking food that cannot be cooked on cooking rack 54, such as pancakes and eggs. Surface 84 can be made from or coated with a non-stick cooking material such as Teflon.

Figure 16:
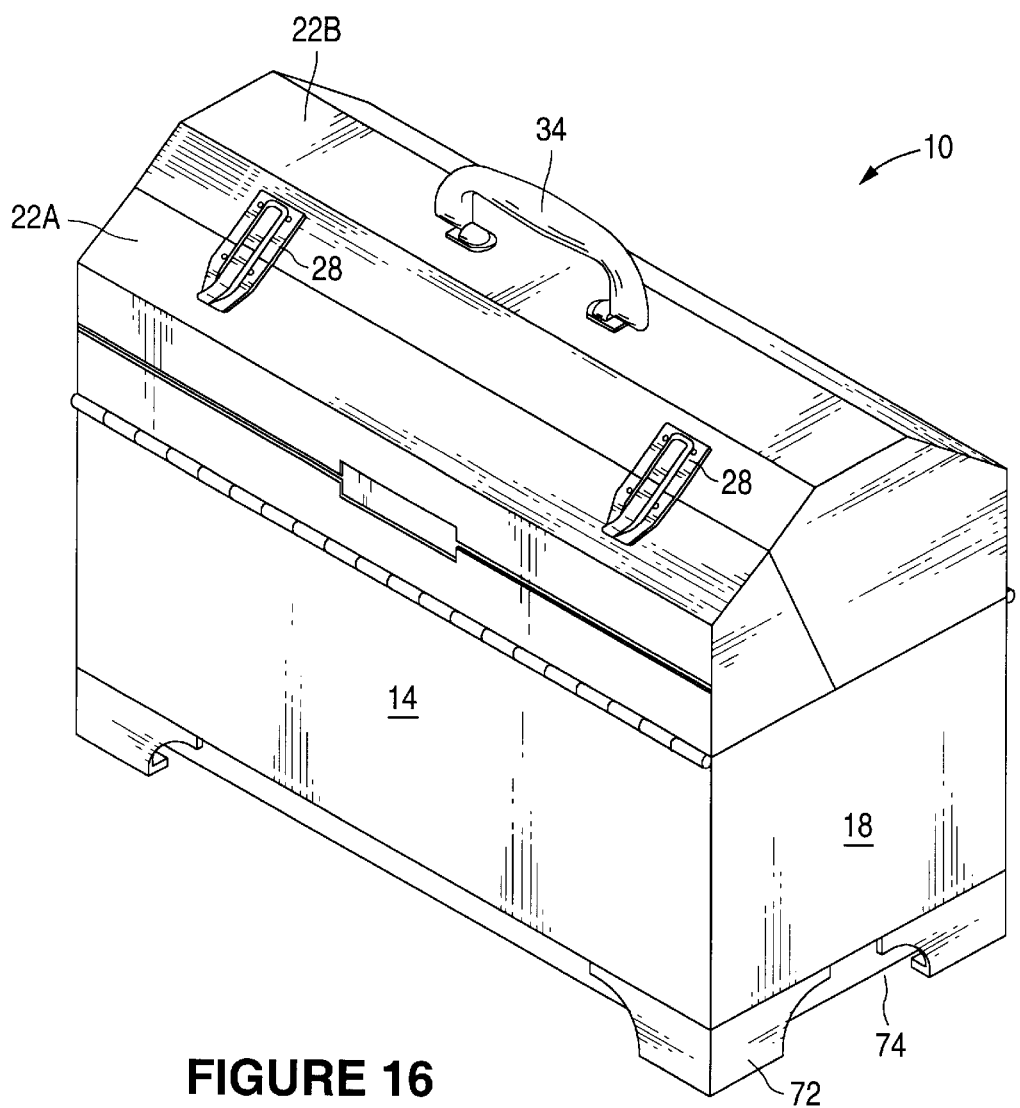
FIG. 16 is a perspective view of another embodiment of the portable grill of the present invention.
Figure 17:
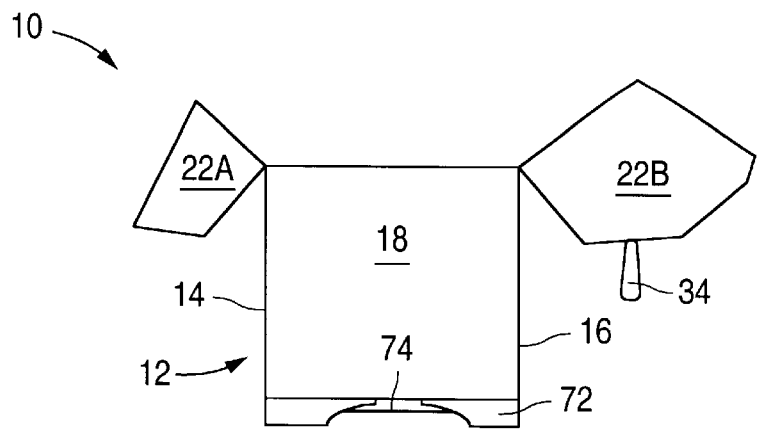
FIG. 17 is a side view of the portable grill of FIG. 16.
Figure 18:
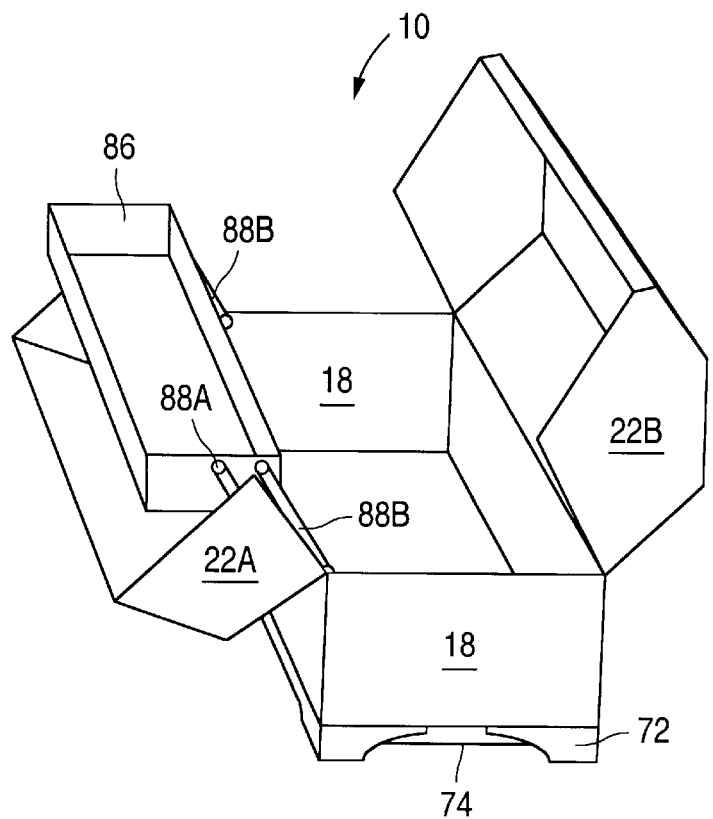
FIG. 18 is a perspective view of the portable grill of FIG. 16 including a tray in accordance with one embodiment of the present invention.

In accordance with another embodiment of housing unit 12, as illustrated in FIGS. 16–18, lid 22 can include a first and second lid sections 22A and 22B pivotally connected to front 14 and rear 16 walls, respectively. First and second lid sections 22A and 22B can pivotally come together to enclose housing unit 12. A pair of locking elements 28 is shown to lock first lid section 22A to second lid section 22B. Referring to FIG. 18, a tray 86 is illustrated to be pivotally coupled to lid 22A and sidewalls 18 via pivot arms 88A and 88B, respectively. Pivot arms 88A and 88B allow tray 86 to remain in a generally horizontal position, as illustrated, when lid 22A is opened and closed, to prevent the contents of tray 86 from falling out.

While particular embodiments of the present invention have been shown and described, it will be obvious to those skilled in the art that changes and modifications can be made without departing from the embodiments this invention in its broader aspects and, therefore, the appended claims are to encompass within their scope all such changes and modifications as fall within the true spirit and scope of the embodiments this invention.

What is claimed is:

1. A portable barbeque grill, comprising:
   (a) a firebox for containing a burning element; and
   (b) a housing unit for containing the firebox;
wherein the firebox comprises a front wall, a rear wall, side walls, and flanges, the flanges extending from the corners where the front wall and/or the rear wall meet the side walls for creating a gap between the walls of the firebox and the walls of the housing unit, wherein the firebox is positioned at a distance away from the housing unit to create a gap between the burning element and the housing unit, and wherein the housing unit comprises a front wall, a rear wall, and sidewalls.

2. The portable barbeque grill of claim 1, further comprising:
   a platform assembly supporting the walls of the firebox for elevating the walls of the firebox at a position above the bottom wall of the housing unit.

3. The portable barbeque grill of claim 2, wherein the platform has a grid like structure for allowing residues of the burning element to fall within the housing unit on top of the bottom wall.

4. The portable barbeque grill of claim 2, wherein the platform is defined by a grid-like base and a pair of opposing flanges extending from the base for elevating the grid-like base above the bottom wall of the housing unit.

5. The portable barbeque grill of claim 1, wherein said flanges extend beyond a bottom wall of the firebox for elevating the bottom wall of the firebox above a bottom wall of the housing unit.

6. The portable barbeque grill of claim 1, wherein at least one of the walls of the firebox contains a plurality of holes.

7. The portable barbeque grill of claim 1, wherein the housing unit further comprises a bottom wall, an open top, and a lid pivotally connected to the rear wall of the housing unit for releasably locking to the front wall of the housing unit for enclosing the open top.

8. The portable barbeque grill of claim 7, wherein the lid comprises a handle bar for allowing a user to lift and carry the portable barbeque grill when the lid is in a locked position.

9. The portable barbeque grill of claim 7, wherein the lid comprises a lift tab for allowing a user to open and close the lid.

10. The portable barbeque grill of claim 7, wherein the lid in an open state does not extend beyond a generally vertical position for blocking the wind from blowing on the firebox.

11. The portable barbeque grill of claim 7, wherein the lid in an open position does not extend beyond a generally horizontal position for allowing a user to place food or barbeque tools on an inside face of the lid.

12. The portable barbeque grill of claim 11, additionally comprising a support rod extending from the lid for supporting the lid against the surface upon which the portable barbeque grill is placed, the support rod prevents portable the barbeque grill from tipping over if food or barbeque tools are placed on the inside face of the lid.

13. The portable barbeque grill of claim 1, further comprising a tray which can be inserted and removed from the housing unit, wherein the tray rests on top of the firebox when placed within the housing unit.

14. The portable barbeque grill of claim 1, wherein the housing unit further comprises a bottom wall, and an open top and wherein the portable barbeque grill additionally comprises a first lid section pivotally connected to the rear wall of the housing unit and a second lid section pivotally connected to the front wall of the housing unit, the first and second lid sections can pivotally come together to enclose the open top.

15. The portable barbeque grill of claim 14 additionally including a tray pivotally connected to the side walls with a first arm element and to the first lid section with a second arm element, wherein the tray remains in a generally horizontal position when the first lid section is opened and closed.

16. The portable barbeque grill of claim 1, additionally comprising:

(a) legs extending from the housing unit for elevating the housing unit above a surface upon which the housing unit is placed; and (b) a heat shield coupled to the legs and positioned at a distance away from a bottom surface of the housing unit.

17. The portable barbeque grill of claim 16, wherein the heat shield prevents the surface upon which the housing unit is placed from significantly charring.

18. The portable barbeque grill of claim 1, additionally including a heat shield positioned at a distance away from the bottom surface of the housing unit.

19. A barbeque grill, comprising:

a generally rectangular housing defining a generally rectangular cavity and having a generally rectangular upper periphery defining a generally rectangular opening into the cavity;

a generally rectangular lid for covering the opening into the cavity being pivotally coupled to a portion of the upper periphery of the housing by a piano hinge, the lid having a vent for providing an air passage into the cavity when the lid is covering the opening into the cavity;

a generally rectangular platform being disposed in the cavity of the housing, the platform having a generally parallel pair of downwardly depending longitudinal legs extending along a pair of long sides of the platform, the longitudinal legs resting on a bottom portion of the housing so that the platform is space above the bottom portion of the housing;

the platform and longitudinal legs comprising expanded metal defining a plurality of apertures through the platform and longitudinal legs;

a generally rectangular fire box being disposed in the cavity of the housing and having a generally rectangular open top and bottom, the open bottom of the fire box resting on the platform; and a generally rectangular cooking rack being disposed in the cavity of the housing and resting on the open top of the fire box so that the cooking rack and the platform lie in generally parallel planes in the cavity, the cooking rack comprising expanded metal defining a plurality of apertures through the cooking rack.

20. A barbeque grill, comprising:

a generally rectangular housing defining a generally rectangular cavity and having a generally rectangular upper periphery defining a generally rectangular opening into the cavity;

a generally rectangular lid for covering the opening into the cavity being pivotally coupled to a portion of the upper periphery of the housing by a piano hinge, a latch for releasably attaching a portion of the lid to the housing when the lid is covering the opening into the cavity;

the housing having a plurality of downwardly extending feet for spacing a bottom portion of the housing above a resting surface, each foot of the housing having a pair of concave arcuate side edges, at least of the feet having an inwardly extending lower resting flange for engaging the resting surface;

a generally rectangular platform being disposed in the cavity of the housing, the platform having a generally parallel pair of downwardly depending longitudinal legs extending along a pair of long sides of the platform, the longitudinal legs resting on a bottom portion of the housing so that the platform is space above the bottom portion of the housing;

the platform and longitudinal legs comprising expanded metal defining a plurality of apertures through the platform and longitudinal legs;

a generally rectangular fire box being disposed in the cavity of the housing and having a generally rectangular open top and bottom, the open bottom of the fire box resting on the platform; and a generally rectangular cooking rack being disposed in the cavity of the housing and resting on the open top of the fire box so that the cooking rack and the platform lie in generally parallel planes in the cavity, the cooking rack comprising expanded metal defining a plurality of apertures through the cooking rack.

* * * * *